United States Patent [19]

Kabasin

[11] Patent Number: 5,090,511
[45] Date of Patent: Feb. 25, 1992

[54] ADAPTIVE VEHICLE TRACTION CONTROL SYSTEM

[75] Inventor: Daniel F. Kabasin, Rochester, N.Y.

[73] Assignee: General Motors Corporation, Detroit, Mich.

[21] Appl. No.: 539,300

[22] Filed: Jun. 18, 1990

Related U.S. Application Data

[63] Continuation of Ser. No. 393,181, Aug. 14, 1989, abandoned.

[51] Int. Cl.$^5$ .............................................. B60K 31/00
[52] U.S. Cl. .................................. 180/197; 364/426.03
[58] Field of Search ................................ 180/197, 76; 364/426.03, 426.02

[56] References Cited

U.S. PATENT DOCUMENTS 4,682,667  7/1987  Hosaka ...................... 364/426.03 X
4,721,176  1/1988  Kabasin ............................. 180/197
4,823,269  4/1989  Fujioka et al. ................. 180/197 X

FOREIGN PATENT DOCUMENTS 63-31869  2/1988  Japan ............................... 180/197

Primary Examiner—Charles A. Marmor
Assistant Examiner—Alan M. Kagen
Attorney, Agent, or Firm—Howard N. Conkey

[57] ABSTRACT

A traction control system for a vehicle in which the rate of reduction of the torque input to the driven wheels of the vehicle in response to an excessive spin condition is varied as a function of the road surface coefficient of friction. The rate of increase of wheel spin is measured as an indicator of the road surface coefficient of friction and the area of the air intake of the engine is reduced at a rate that is in inverse proportion to the measured rate of increase of wheel spin. The rate of torque reduction is also made a function of the magnitude of wheel spin. The area of the air intake following recovery from an excessive spin condition is increased at a rate that is in inverse proportion to the road surface coefficient of friction.

1 Claim, 3 Drawing Sheets

ADAPTIVE VEHICLE TRACTION CONTROL SYSTEM

This is a continuation of application Ser. No. 07/393,181, now abandoned filed on Aug. 14, 1989.

BACKGROUND OF THE INVENTION

This invention relates to a vehicle traction control system and more particularly to such a system which is adaptive to the road surface coefficient of friction to limit the drive wheel torque input in the event of excess wheel spin.

It is a common experience with automotive vehicles for excess wheel spin to occur during vehicle acceleration when the operator initiated engine output torque delivered to the driven wheels are such that the frictional forces between the tire and the road are overcome. While a small amount of spin between the tire and the road surface is necessary in order to achieve a driving force, excessive spin results in the reduction of effective driving force and the lateral stability of the vehicle.

Systems have been proposed to limit the torque input to the driven wheels for traction control. Typically, these systems limit spin when the spin value reaches a predetermined condition by controlling the wheel driving torque independent of the road surface condition. However, a reaction to a wheel spinning condition may enhance stability and/or operator comfort when accelerating on one road surface condition but not when accelerating on another road surface condition.

Consequently, it would be desirable to provide a traction control system that would tailor the control of the torque applied to the driven wheels to the particular road surface condition so as to enhance stability of the vehicle and provide a satisfactory performance over all road surface conditions.

SUMMARY OF THE INVENTION

This invention provides for limiting wheel spin on a road surface during vehicle acceleration to maintain vehicle stability and assure operator comfort over all road surface conditions by adapting the control of the driving torque applied to the driven wheels to a characteristic of the road surface.

In accord with this invention, the rate of reduction of the torque input to the driven wheels in response to an excessive spin condition is varied as a function of the road surface coefficient of friction which is measured by determining the rate of increase in driven wheel spin. Specifically, the rate of reduction of torque is in inverse proportion to coefficient of friction of the road surface and in direct proportion to the rate of increase in driven wheel speed. Additionally, the rate of torque reduction may also be a function of the magnitude of wheel spin. In a specific form of the invention, the control of the driving torque to the driven wheels is established through control of the area of the air intake of the engine.

To further establish the adaptive aspects of this invention, the driving torque following recovery from an excessive spin condition is increased at a rate that is in direct proportion to the road surface coefficient of friction, and in inverse proportion to the rate of increase in driven wheel speed.

In one aspect of the invention, the rate of increase in driven wheel spin and therefore the road surface coefficient of friction is determined by determining the time lapse from the time wheel spin exceeds a low threshold to when the wheel spin exceeds a high threshold.

DESCRIPTION OF THE DRAWINGS

The invention may be best understood by reference to the following description of a preferred embodiment and the drawings in which.

DESCRIPTION OF A PREFERRED EMBODIMENT

Figure 1:
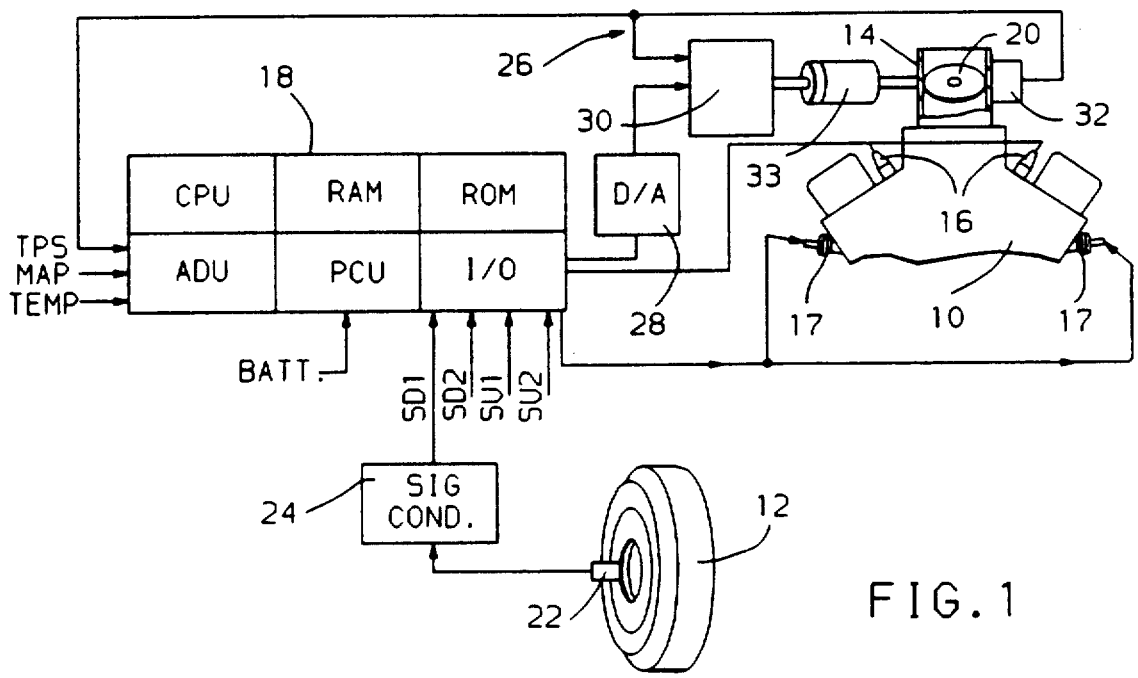
FIG. 1 is a general diagram of an engine controller for limiting the driven wheel spin in accord with the principles of this invention.

Referring to FIG. 1, there is illustrated a vehicle internal combustion engine 10 that operates to apply a driving torque via the conventional vehicle drive train to the vehicle driven wheels, such as the wheel 12. Air is drawn into the engine intake manifold through a throttle bore 14 and mixed with fuel injected into the intake manifold by electromagnetic fuel injectors 16. The air and fuel mixture in turn is drawn into the cylinders of the engine 10 where it is ignited by respective spark plugs 17 and undergoes combustion, thereby generating torque applied to the driven wheels.

The injectors 16 are controlled by a digital control unit 18 in response to measured values of engine parameters including the manifold absolute pressure MAP provided by a conventional pressure sensor, engine coolant temperature TEMP provided by a conventional temperature sensor and engine speed to establish a predetermined air/fuel ratio, such as the stoichiometric ratio. The spark plugs 17 are controlled in response to parameters such as manifold pressure and engine temperature to establish a desired ignition timing at a scheduled advance angle before cylinder top dead center.

Air flow into the engine 10 is controlled by a conventional throttle blade 20 in the throttle bore 14 that is positioned by the vehicle operator for controlling the operation of the engine 10. As will be described, the position of the throttle blade 20 is limited so as to prevent the torque applied to the vehicle wheels of the engine 10 from becoming excessive thereby causing the wheels to experience excessive spin.

In order to provide for traction control, the speed of the driven and undriven wheels are provided to the control unit 18. These signals are in the form of squarewave signals SD1 and SD2 (for the driven wheels) and SU1 and SU2 for the undriven wheels having a frequency directly proportional to wheel speed. The wheel speed sensors may take the form of an electromagnetic pickup 22 sensing the passing of teeth rotating with the wheel 12. The resulting alternating signal having a signal proportional to the speed of the wheel 12 is provided to a signal conditioner 24 which provides the squarewave signal SD1 representing the speed of the driven wheel 12. The remaining wheel speed signals are provided in similar manner in response to rotation of the remaining three wheels of the vehicle. The power output of the engine is limited by the electronic controller for traction control by establishing a limit position of the throttle blade 20 corresponding to a commanded throttle area established in accord with the principles of this invention. The throttle position limit is established by means of a closed loop control circuit 26. The control unit 18 provides a digital signal to a digital-to-analog converter 28 representing a commanded limit position of the throttle blade 20. The analog signal output of the converter 28 representing the limit position is provided to a driven circuit 30 in the closed loop control circuit 22. The drive circuit 30 also receives a signal representing the actual position of TPS of the throttle blade 20 from a potentiometer 32 driven by the shaft of the throttle blade 20.

The drive circuit 30 is a conventional proportional plus integral circuit responding to the difference between the commanded limit position of the throttle blade from the converter 28 and the actual position provided by the potentiometer 32. The sum of the integral and proportional terms from the circuit 30 are provided to a torque motor 33 which drives the throttle blade 20 to a position in accord with the limit position from the digital-to-analog converter 28.

The electronic controller 18 takes the form of a digital computer that is standard in form and includes a central processing unit (CPU) which executes an operating program permanently stored in a read-only memory (ROM) which also stores tables and constants utilized in controlling the fuel injected by the injectors 16, in controlling the spark timing signals to the spark plugs 17 and in positioning the throttle blade 20 for limiting engine power to control wheel spin. Contained within the CPU are conventional counters, registers, accumulators, flag flip flops, etc. along with a clock which provides a high frequency clock signal.

The computer also includes a random access memory (RAM) into which data may be temporarily stored and from which data may be read at various address locations determined in accord with the program stored in the ROM. A power control unit (PCU) receives battery voltage and provides regulated power to the various operating circuits in the control unit 18.

The control unit 18 further includes an input/output (I/O) circuit comprised of an input section for receiving the squarewave speed signals representing the speed of the four vehicle wheels and an output section that provides the digital signal to the digital-to-analog converter 28 representing a commanded limit position of the throttle valve 20, provides a timed injection pulse to the fuel injector 16 and provides timed signals to the spark plugs 17 to ignite the mixture in the individual cylinders. The input/output circuit may also receive an output from a conventional vehicle ignition distributor or other well known engine position transducers providing a signal in the form of a pulse with each intake event. These pulses are utilized by the control unit 18 for initiating the injection pulses to the injectors 16 and the spark signals to the spark plugs 17.

The input/output circuit also includes an input counter section which receives the pulse output of the signal conditioners such as the conditioners 36 representing the speed of the four vehicle wheels. The wheel speeds are then determined such as by counting clock pulses between wheel speed pulses. Alternatively, a separate counter may be utilized for receiving and processing the wheel speed inputs so as to establish the four wheel speeds. These speeds will then be available to the control unit 18 for traction control as will be described.

Figure 2:
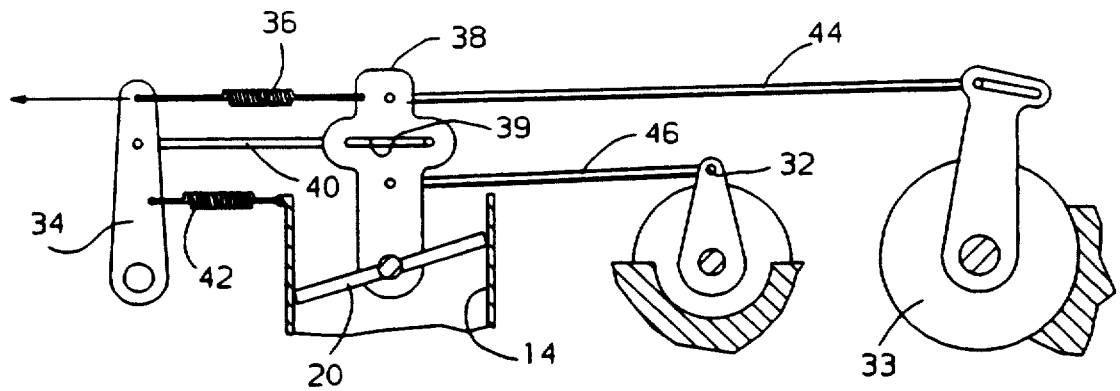
FIG. 2 is a schematic of a mechanism for positioning and limiting the throttle position in the engine throttle bore.

The control unit 18 further includes an analog-to-digital unit (ADU) which provides for measurement of the analog signals including the manifold absolute pressure (MAP), engine temperature (TEMP) and throttle position (TPS). These signals are sampled and converted under control of the CPU and stored in ROM designated RAM memory locations The apparatus for controlling the position of the throttle blade 20 in the throttle bore 14 in response to the vehicle operator input and for limiting the position of the throttle blade 20 to limit wheel spin is illustrated in FIG. 2. In general, the throttle blade 20 is positioned by the operation of the conventional vehicle accelerator pedal by the vehicle operator by means of a lever 34 coupled to a spring 36 through a throttle arm 38. The lever 34 is also coupled to the throttle arm 38 via a rod secured at one end to the lever 34 and having its opposite end bent so as to extend through a slot 39 in the throttle arm 38 thereby forming a lost motion connection.

The spring 36 normally biases the lever 34 and the throttle arm 38 toward one another such that the end of the rod 40 extending through the slot 39 engages the extreme end of the slot 39. With this arrangement, a spring 42 biases the throttle lever 38 in direction to close the throttle blade 20 via the lever 24 and the rod 40 bearing against the end of the slot 39 in the throttle arm 38.

In operation, as the lever 34 and rod 40 are moved by operation of the vehicle accelerator pedal, the throttle arm 38 is moved therewith via the bias of the spring 36 to open the throttle blade 20. Upon release of the throttle by the vehicle operator, the throttle blade 20 is returned to the closed position via the spring 42.

In order to limit the throttle position for traction control, the DC torque motor 33 previously described is coupled to the throttle arm 38 via a rod 44. Under control of the controller 18 via the closed loop circuit 26, the DC torque motor 33 may be energized to generate a torque tending to rotate its output shaft in a clockwise direction as viewed in the drawing against the force of the spring 36 to limit the throttle position. Within the limits established by the slot 39, the throttle may be positioned independent of the position of the lever 34 established by the vehicle operator to limit the power output of the engine applied to the wheel 12 to limit wheel spin.

The throttle position sensor 34 previously described is positioned by means of a linkage 46 to provide the signal TPS representative of the position of the throttle 20 in the throttle bore 14.

Figure 3A:
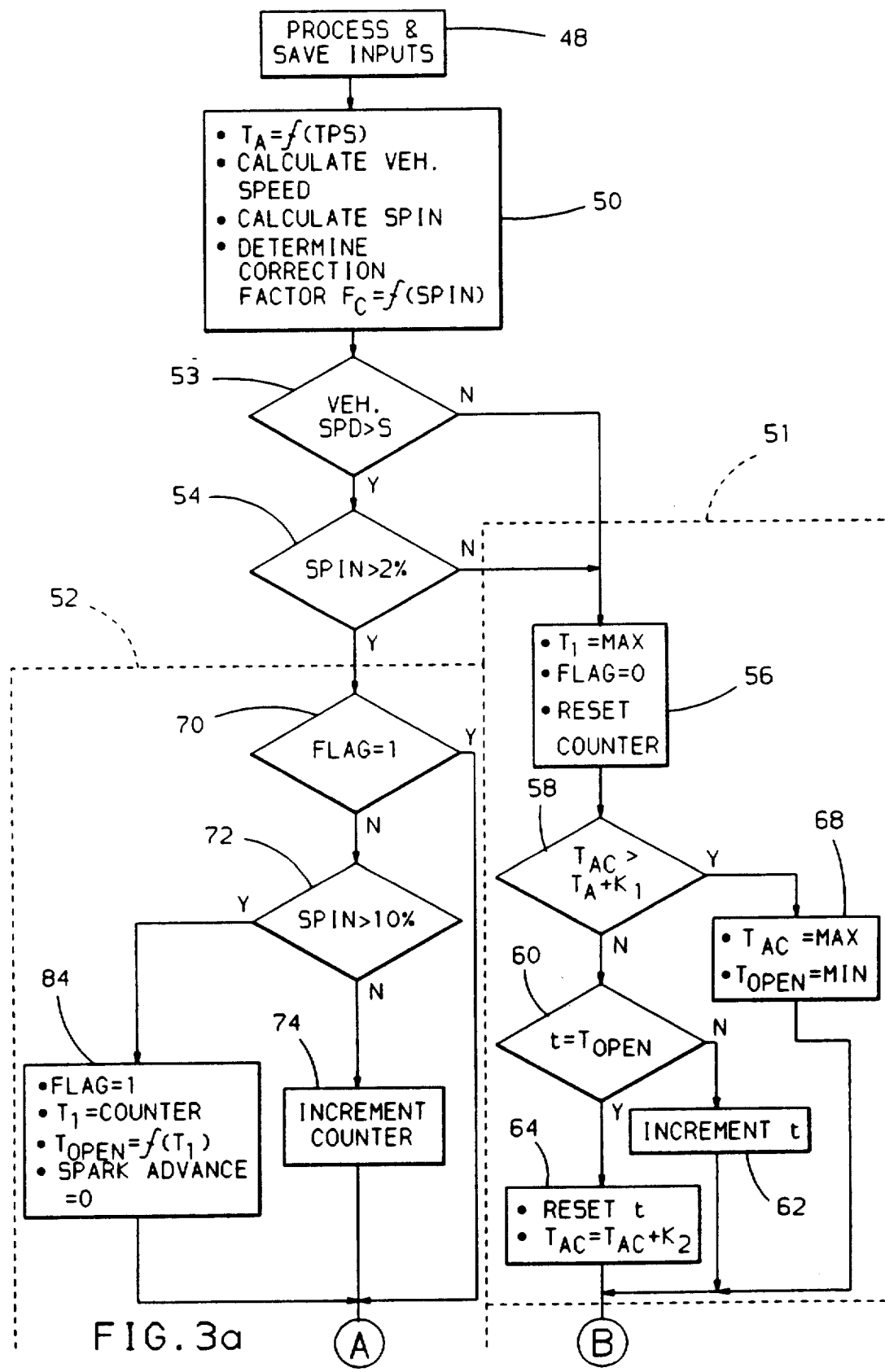
FIGS. 3a and 3b are diagrams illustrating the operation of the system of FIG. 1 in limiting wheel slip.
Figure 3B:
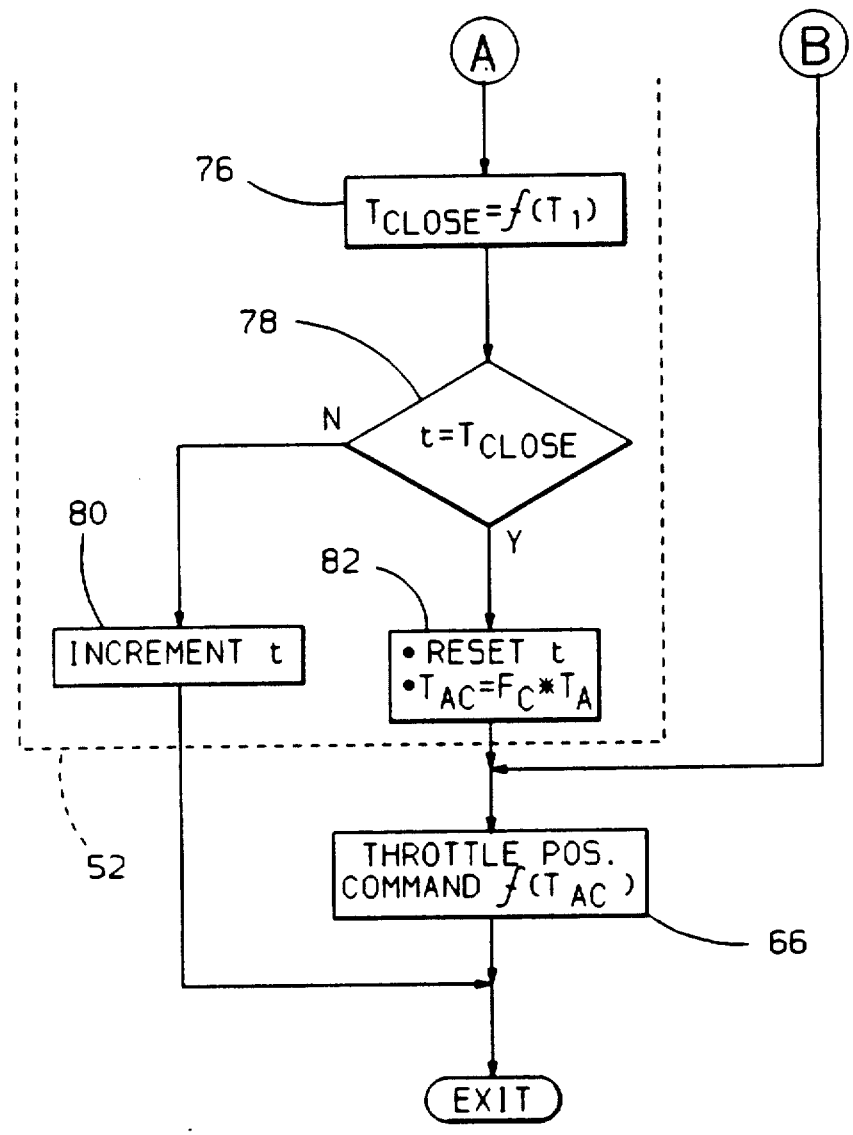

The routine for limiting wheel slip in accord with this invention is illustrated in FIG. 3. The ROM contains the instructions necessary to increment the algorithm as diagrammed in FIG. 3. It should be noted that in describing the functions of the algorithm encoded in the ROM, references to tasks which have been detailed as flow diagram function blocks will be designated by <nn>, where nn is the diagram reference number and < > indicates that the concept described by the particular flow diagram function block text is being referenced. The text in the flow diagram blocks is intended to describe the general task or process being executed by the controller at that point, the text does not represent the actual ROM instructions. It is recognized that there are a variety of known information processing languages available to one skilled in the art to construct the actual instructions necessary to accomplish the task described by the text in the flow diagram function blocks.

The routine for traction control is executed at predetermined interrupt intervals such as 10 milliseconds as established by the CPU. When the interrupt is initiated, the program first processes and saves the various inputs thereto including the manifold absolute pressure, engine temperature and throttle position supplied to the ADU of the control unit 18 and the four-wheel speed signals provided to the I/O <48>.

A number of parameters are then determined based on the measured parameters <50>. These include (A) the actual throttle area $T_A$ obtained from a lookup table as a function of the throttle position, (B) vehicle speed such as from the average of the undriven wheel speeds SU1 and SU2, (C) wheel spin such as from the expression (Sd−Su)/Su where Sd is the speed of the fastest driven wheel and Su is the average speed of the two undriven wheels and (D) a correction factor $F_C$ obtained such as from a lookup table storing values of the correction factor $F_C$ as a predetermined function of the determined value of wheel spin. The correction factor $F_C$ is an engine torque reduction multiplier less than unity used as will be explained as one factor establishing the rate of reduction of engine output torque in response to slip exceeding a low threshold. In general, the stored values of the correction factor establish an inverse functional relationship between $F_C$ and wheel spin, i.e., the retrieved value of $F_C$ decreases from unity as wheel spin increases.

The routine next determines whether to execute a throttle limit opening routine 51 or a throttle limit closing routine 52. The throttle limit opening routine 51 is executed if either the vehicle speed is equal to or less than a calibration value S which may be zero or some small value <53> or if wheel spin is equal to or less than a low threshold such as 2% <54>. A spinning condition is ignored via the vehicle speed criteria and the throttle limit opening routine 51 is executed to enable a vehicle operator to free the vehicle from a stuck condition.

Assuming the throttle limit opening conditions are met <53,54>, various parameters are initialized <56> that are used primarily in the throttle limit closing routine 52. This step includes setting a count $T_1$ to an initial maximum value, resetting a flag indicating the status of the identification of the road surface coefficient of friction as represented by the rate of change in wheel slip and resetting a counter used in determining the road coefficient of friction. A reset flag indicates that the road surface coefficient of friction has not been identified.

If the throttle area is still being limited to limit engine torque output as a result of the operation of the throttle limit closing routine 52 in response to a prior excessive wheel slip condition and therefore not under the control of the vehicle operator, the throttle limit opening routine 51 increases the throttle area and therefore engine output torque at a controlled rate that is directly proportional to the road surface coefficient of friction identified during the throttle angle limit closing routine, i.e., the controlled rate increases in value for increasing values of the road surface coefficient of friction. This feature provides for stability on low coefficient of friction road surfaces where a rapid torque application may lead to oscillation in spin control and provides high driving forces on high coefficient of friction surfaces.

An engine torque limiting condition is represented by a throttle area limit command $T_{AC}$ that is greater than the actual throttle area $T_A$ by a value $K_1$ <58>. When this condition is sensed, the throttle area command is increased at a rate determined by the value of $T_{OPEN}$ <60,62,64>. With each execution of the traction control routine of FIG. 3, a time t will be incremented <62> until it equals $T_{OPEN}$ <60> after which t is reset and the throttle area limit command $T_{AC}$ is increased by $K_2$ <64>. In this manner, the throttle area limit command is increased at a rate that is determined by and that is inversely proportional to $T_{OPEN}$. As will be described, the value of $T_{OPEN}$ is inversely proportional to the road surface coefficient of friction so that the throttle area limit command $T_{AC}$ is increased at a rate that is directly proportional to the road surface coefficient of friction.

A throttle position command required to establish the throttle area equal to $T_{AC}$ is determined via a lookup table and issued to the D/A 28 of FIG. 1 <66>. The controller 26 then operates to position the throttle blade 20 to the commanded position. The result is that as $T_{AC}$ is ramped, the engine torque output is ramped at a controlled rate that is dependent upon the road surface coefficient of friction.

When the throttle area limit command $T_{AC}$ is or becomes larger that the actual throttle area $T_A$ plus some small value $K_1$, the routine is no longer limiting throttle position and therefore engine torque and control has been returned to the vehicle operator. When this condition is sensed <58>, the throttle area limit command $T_{AC}$ is set to a maximum value to allow the operator to control the throttle unrestricted at all throttle angles and $T_{OPEN}$ is set to a minimum value <68>. The throttle position command corresponding to the maximum value of $T_{AC}$ is determined and issued to the D/A 28 which established a condition allowing the operator to position the throttle blade 20 to wide open position <66>.

When the vehicle speed is greater than S <53> and the wheel spin becomes greater than the low threshold <54> the throttle angle limit closing routine is executed to limit the engine torque output for wheel spin control. In general, the engine torque output is decreased at a rate that varies directly with the value of wheel slip and inversely with the road surface coefficient of friction. In other words, the rate of decrease in engine torque output increases with increasing values of wheel spin and increases with decreasing values of the road surface coefficient of friction. This provides a rapid response to spin on a low road surface coefficient of friction to maintain vehicle stability. First, it is determined if the road surface coefficient of friction has been identified as represented by a set condition of the flag that was initialized to a reset condition at step 54 <70>. In this embodiment, the road surface condition is measured by determining the rate of increase in wheel spin. This in turn is determined by the time lapse from wheel spin at the low threshold to wheel spin at a high threshold such as 10%. Assuming the road surface condition has not been identified <64> and that wheel slip is below the high threshold <72> the counter previously initialized at step 54 is incremented to provide a measure of the time lapsed since wheel slip exceeded the low threshold <74>.

The next series of steps establish the rate of decrease in the throttle area and therefore engine torque output to limit wheel spin. First, one factor $T_{CLOSE}$ establishing the rate of engine torque reduction is established from a lookup table storing values of $T_{CLOSE}$ that vary as a direct function of the value of $T_1$ <76>. The stored values of $T_{CLOSE}$ establish a direct functional relationship between $T_{CLOSE}$ and $T_1$, i.e., the retrieved values of $T_{CLOSE}$ increase as $T_1$ increases. Recalling that $T_1$ was initialized to a maximum value at step 56, $T_{CLOSE}$ is therefore set at this time to a maximum value which will remain constant until the road surface condition is identified.

Thereafter, the throttle area limit command $T_{AC}$ is reduced at a rate determined by the value of $T_{CLOSE}$ and the correction factor $F_C$ determined at step 50 as a function of wheel spin <78,80,82>. With each execution of the traction control routine of FIG. 3, the time t will be incremented <80> until it equals $T_{CLOSE}$ <78> after which t is reset and the throttle area limit command $T_{AC}$ for controlling the throttle position <66> is set equal to a value less than the actual throttle area $T_A$ by an amount established by the correction factor $F_C$ <82>. In this manner, the throttle area limit command $T_{AC}$ is decreased at a rate determined by and inversely proportional to $T_{CLOSE}$ and determined by and inversely proportional to the value of the correction factor $F_C$. Prior to the spin exceeding the upper spin threshold at which time the surface condition is identified, $T_{CLOSE}$ is constant at a maximum value tending to establish a low rate of decrease in the throttle area limit command $T_{AC}$ and therefore engine torque output. During this period the rate of decrease in the throttle area command $T_{AC}$ is variable in inverse relationship to the correction factor $F_C$ and thereby directly proportional to the wheel spin so that a higher rate of engine torque reduction is provided for higher wheel spin values.

When the wheel spin exceeds the upper limit, the count in the counter incremented at step 74 is the time lapse from wheel spin at the low threshold (2%) to wheel spin at the high threshold (10%) and represents the rate of increase in wheel spin and represents a measure of the road surface coefficient of friction. Specifically the count will be larger for lower rates of increase in wheel spin corresponding to higher coefficient of friction values. When this condition is sensed <72>, (A) the flag is set to indicate that the road surface condition has been identified, (B) $T_1$ is set to the value of the counter, which is the time lapse from wheel spin at the low threshold to wheel pin at the high threshold, and therefore represents the rate of increase in wheel spin as a measure of the road surface coefficient of friction, (C) $T_{OPEN}$ is set to a value obtained from a lookup table storing values of $T_{OPEN}$ that vary in a predetermined inverse relation to $T_1$ so that the rate of engine torque increase after wheel spin is reduced to below the low threshold as previously described is directly proportional to the surface coefficient of friction which (keeping in mind the relative relationships between the count, rate of increase in wheel spin and coefficient of friction set forth above) is in inverse relation to the rate of increase in wheel spin and (D) spark advance is set to zero for additional torque reduction <84>. Once the road surface condition has been identified, $T_{CLOSE}$ is then set to a value from a lookup table as previously described that is directly proportional to $T_1$ which is the time lapse that is a measure of the road surface coefficient of friction <76>. The effect of setting $T_{CLOSE}$ in a direct relationship to $T_1$ is to vary the rate of decrease in the throttle area limit command via step 82 and therefore engine torque output via step 66 in an inverse relation to the time lapse and therefore in direct relation to the rate of increase in wheel spin and in inverse relation to the surface coefficient of friction. In other words, the rate of engine torque reduction increases with decreasing values of the road surface coefficient of friction. When spin thereafter is controlled to below the low threshold <54> in response to the decreasing engine torque output, the throttle limit opening routine 51 is executed as previously described to increase the engine torque output at a rate established at step 84 that is directly proportional to the surface coefficient of friction.

In summary, the throttle limit closing routine 52 reduces the engine torque output at a rate directly proportional to wheel spin and further at a rate that is varied in inverse relationship to the road surface coefficient of friction. Following wheel spin recovery, the throttle limit opening routine 51 increases the engine torque output at a rate that is varied in direct relationship to the road surface coefficient of friction.

The foregoing description of a preferred embodiment of the invention for the purpose of illustrating the invention is not to be considered as limiting or restricting the invention since many modifications may be made by exercise of skill in the art without departing from the scope of the invention.

The embodiments of the invention in which an exclusive property or privilege is claimed are defined as follows:

1. A method of adaptively controlling spin of a driven wheel of a vehicle having an engine for applying driving torque to the driven wheel, the method comprising the steps of:

determining wheel spin;

determining a time lapse from a time the determined wheel spin first exceeds a low spin threshold to a time the determined wheel spin first exceeds a high spin threshold;

reducing the driving torque applied to the wheel while the determined wheel spin is between the low and high spin thresholds at a rate having a predetermined direct relationships to the determined wheel spin; and reducing the driving torque applied to the wheel while the determined wheel spin is greater than the second spin threshold at a rate having (a) a predetermined inverse relationship to the time lapse and (b) the predetermined direct relationship to the determined wheel spin.

* * * * *